US005440094A

United States Patent [19]

Zapletal

[11] Patent Number: 5,440,094

[45] Date of Patent: Aug. 8, 1995

[54] PLASMA ARC TORCH WITH REMOVABLE ANODE RING

[75] Inventor: Jiri Zapletal, P.O. Box 82, Cornish, N.H. 03746

[73] Assignees: Douglas G. Carroll, Brooklandville, Md.; Jiri Zapletal, Claremont, N.H.

[21] Appl. No.: 224,255

[22] Filed: Apr. 7, 1994

[51] Int. Cl.[6] .............................................. B23K 10/00

[52] U.S. Cl. ............................ 219/121.52; 219/121.5; 219/121.48

[58] Field of Search ........... 219/121.5, 121.48, 121.38, 219/121.51, 121.52, 75

[56] References Cited

U.S. PATENT DOCUMENTS

| | | | |
|---|---|---|---|
| 4,521,666 | 6/1985 | Severance, Jr. et al. | 219/121.52 |
| 4,954,688 | 9/1990 | Winterfeldt | 219/121.5 |
| 5,097,111 | 3/1992 | Severance, Jr. | 219/121.52 |
| 5,124,525 | 6/1992 | Severance, Jr. et al. | 219/121.51 |
| 5,132,512 | 7/1992 | Sanders et al. | 219/121.5 |
| 5,308,949 | 5/1994 | Reed, Jr. et al. | 219/121.5 |

*Primary Examiner*—Mark H. Paschall
*Attorney, Agent, or Firm*—Michael E. McCabe, Jr.

[57] ABSTRACT

A plasma arc torch body of this design comprises an anode ring which can be readily removed from a front end of the torch body without adversely effecting the structure or performance of the torch, and which electrically connects the nozzle of the torch to a voltage source.

3 Claims, 2 Drawing Sheets

PLASMA ARC TORCH WITH REMOVABLE ANODE RING

TECHNICAL FIELD

This invention relates to plasma arc torches, and more particularly to a removable anode ring for such torches.

BACKGROUND ART

Plasma arc torches are used for cutting metal material by directing a stream of ionized gas particles toward a work piece. The operation of a conventional plasma torch is described, for example, in U.S. Pat. No. 3,813,510. In the conventional plasma torch, a gas is supplied through an internal passage toward the front end of the torch body, where it is directed in front of an electrode which has a negative charge. Imbedded within the electrode is an insert. Adjacent to the front end of the electrode is a nozzle which is electrically connected to a high voltage source. The nozzle has an axial opening toward the front end of the torch and is electrically insulated from the electrode. When a sufficiently high voltage is applied to the nozzle, an arc jumps from the nozzle to the electrode. The arc heats the gas, which becomes ionized and exits through the axial opening in the nozzle. As the torch is moved closer to the work piece, the arc jumps from the insert in the electrode to the work piece.

In conventional plasma arc torches, the nozzle is nested in an anode which is electrically connected to the high voltage source. The anode of the conventional plasma arc torch is an integral part of the torch and cannot be readily removed or replaced. This feature of the conventional plasma torch is problematic. When the conventional torch is operating, a high voltage is supplied from the electrical connector through the anode and to the nozzle. It is necessary that the nozzle has a good electrical connection with the anode. The nozzle itself is consumed during the operation and frequently requires replacement. There are a number of reasons why after the replacement of the nozzle a small gap between 0.001 and 0.010 inches can be present between the nozzle and the anode. For example, the operator does not tighten firmly enough the enclosure which holds the nozzle or that the enclosure is worn out and cannot press the nozzle firmly onto the seating surface on the anode. Another reason is that during the replacement of the nozzle, particles of dirt from the environment may become trapped on the seating surface between the nozzle and the anode. When this occurs, the voltage supplied to the anode arcs across the gap, damaging the anode. Because the conventional anode is an integral part of the torch body, however, the anode itself cannot be removed or replaced without damaging the torch body. Consequently, even though damage may be limited only to the anode, the entire torch body must be replaced.

The conventional plasma arc torch thus presents a number of disadvantages. One disadvantage is that the useful life to the conventional torch is limited to the life of the anode. Another disadvantage of the conventional torch is that the anode cannot be readily removed for repair or replacement. Another disadvantage is that the cost of maintaining the conventional torch is increased because a torch user cannot simply replace the anode but must instead replace the entire torch.

OBJECTS OF THE INVENTION

It is an object of the present invention to prolong the useful life of a plasma arc torch by providing a plasma arc torch having a replaceable anode.

It is another object of the present invention to provide a plasma arc torch that is constructed to allow easy removal and replacement of the anode.

Still other objects and advantages of the present invention will become readily apparent to those skilled in this art from the following detailed description, wherein the preferred embodiment of the invention is shown and described simply by way of illustration of the best mode contemplated for carrying out the invention.

DISCLOSURE OF THE INVENTION

According to the present invention, the foregoing objects and advantages are attained by a plasma arc torch comprising a torch housing that has an inlet and an outlet at opposite ends. A flow of gas is directed through the housing from the inlet to the outlet. Adjacent to the gas outlet is a negatively-charged electrode mounted within the housing. Imbedded within the electrode is a metallic insert. A nozzle is also mounted within the housing which directs the gas flow toward the electrode. The nozzle is in electrical contact with, and is mounted in, an anode. The anode acts as an electrical bridge between a power source and the nozzle.

During the operation of the plasma torch, gas flows from the inlet through the torch body to the outlet, where it is directed toward the electrode. When a sufficiently high voltage is applied through the anode and to the nozzle, an arc jumps from the nozzle to the electrode. The arc heats the gas, causing the gas to become ionized. The ionized gas then exits through an opening in the nozzle. When the torch housing is sufficiently close to a work piece, the arc will become transferred from the insert in the electrode to the work piece.

The anode of the present invention is detachably fastened to the housing. The anode may be fastened to the housing in any number of ways. One way for fastening the anode is by having an anode with a threaded outer surface which screws into complementary threads in the body of the torch housing. In this manner, the anode can be easily detached from the housing for inspection or replacement without damaging the housing structure or otherwise adversely effecting the performance of the plasma arc torch.

DETAILED DISCLOSURE OF THE INVENTION

Figure 1:
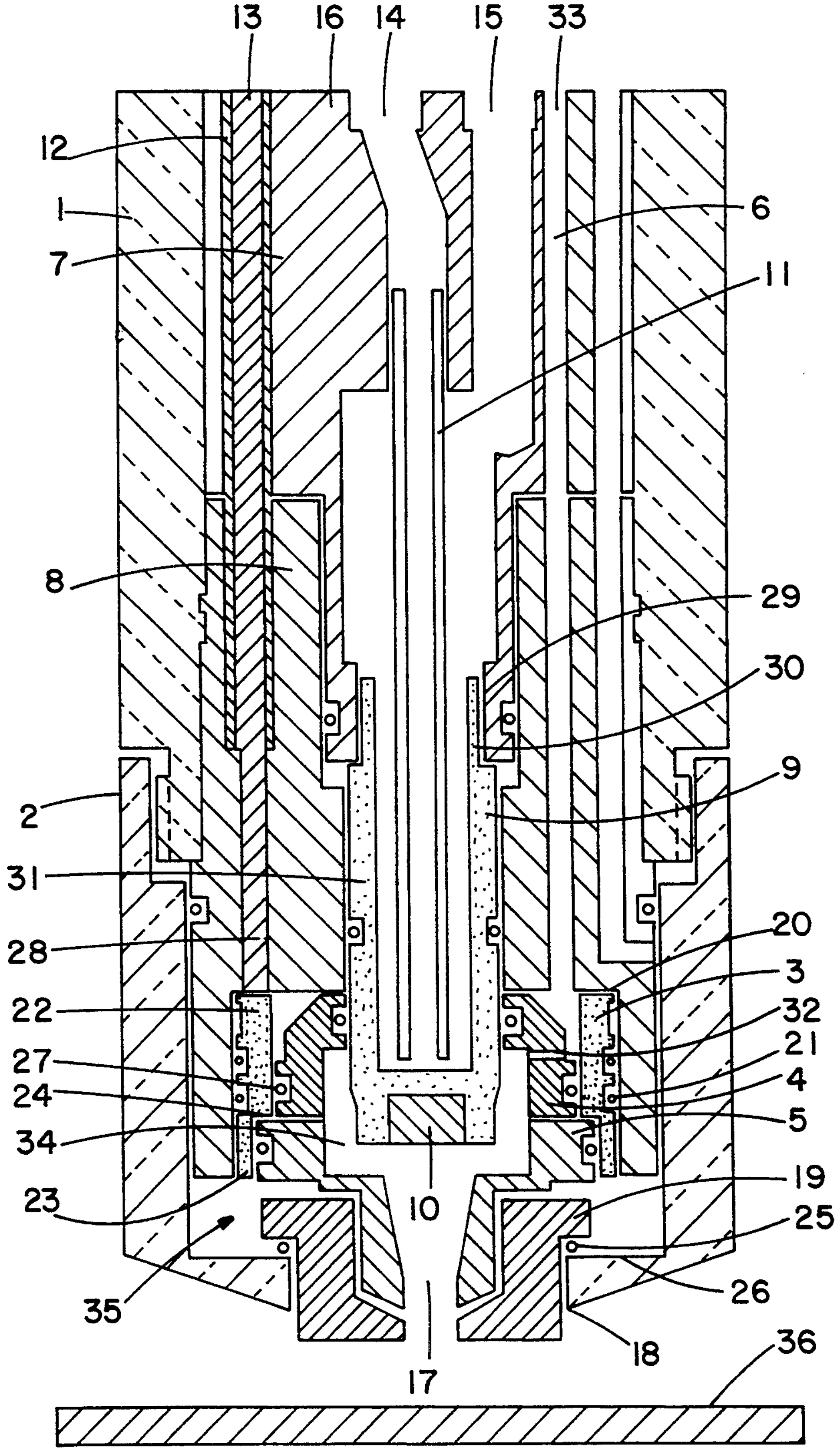
FIG. 1 is an axial cross-section of a plasma arc torch of this invention.

FIG. 1 shows an axial cross-section of the plasma arc torch of the present invention. Retainer 2 is affixed to an outer surface of torch housing 1 by means of threads, or by any other means for ensuring a solid connection between retainer 2 and torch housing 1, thus allowing for easy assembly and disassembly of the retainer and housing. Retainer 2 has an axial opening 18 at the front end of its body, to accommodate a nozzle insulator 19 which protrudes through axial opening 18.

A portion of an outer surface of an anode ring 3, and a lower portion of an inner surface of an insulator 8, have complementary threads, or other fastening means, so that anode ring 3 can be screwed into insulator 8 and seat firmly against a flat portion 20 of insulator 8. Insulator 8, anode ring 3 and a nozzle base 5 define the interior walls of a cylindrical chamber 34. Anode ring 3 includes at least one O-Ring, or other means for sealing, on its outer surface, to prevent moisture from entering the cylindrical chamber via the threads between anode ring 3 and insulator 8. Anode ring 3 also comprises a smaller-diameter inner surface 22, which accommodates a gas swirl 4, and a larger-diameter inner surface 23, which accommodates nozzle base 5. Between the larger and smaller-diameter inner surfaces is a flat portion of step 24. Step 24 forms a seating surface for nozzle base 5.

Figure 3:
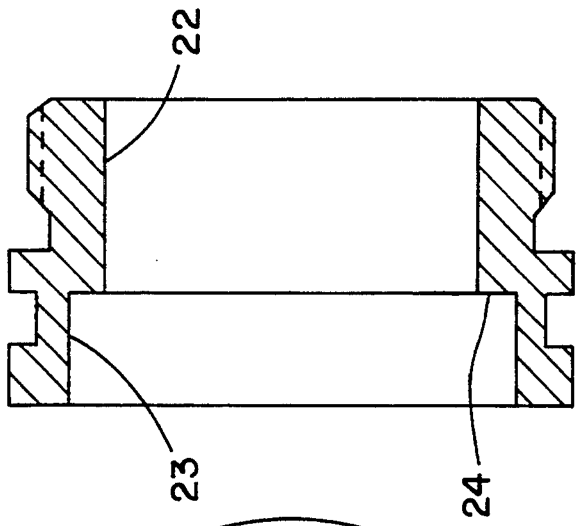
FIG. 3 is a cross-sectional view of the removable anode ring of this invention.
Figure 2:
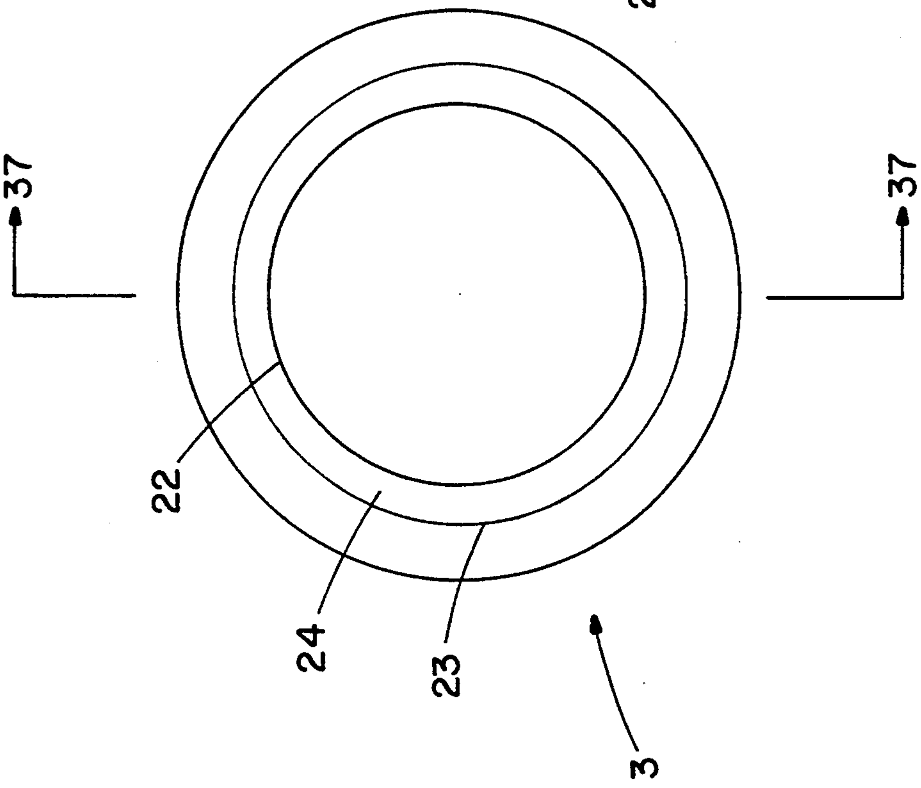
FIG. 2 is an elevational view of the removable anode ring of this invention.

FIGS. 2 and 3 further illustrate the construction of the inventive anode ring 3. As shown in FIG. 2, anode ring 3 is cylindrical in shape. FIG. 3 also demonstrates a placement of step 24 between smaller-diameter inner surface 22 and larger-diameter inner surface 23 of anode ring 3. The anode may, however, be in other shapes or configurations without departing from the scope of this invention.

As shown in FIG. 1, when retainer 2 is screwed onto housing 1, O-Ring 25 is squeezed by the retainer's inner lip 26, causing nozzle assembly 35 to push firmly against step 24 of the anode ring. This assembly ensures that a good electrical connection exists between anode ring 3 and nozzle assembly 35. Nozzle base 5 has an external O-Ring 27 to prevent moisture from entering the cylindrical chamber formed by insulator 8, anode ring 3 and nozzle base 5 along the scaling surface of nozzle base 5.

Also shown in FIG. 1, a high voltage conductor 13 is electrically insulated from a cathode 16 by an insulator 12. A lower end 28 of conductor 13 makes a firm electrical connection with anode ring 3. Cathode 16 is electrically connected to a power source (not illustrated). A lower portion 29 of cathode 16 is fastened to an upper portion 30 of an electrode 9. This fastening can be done, for example, by complementary threads on lower portion 29 and upper portion 30, so that electrode 9 can be screwed into cathode 16. Other means for removably connecting the electrode to the cathode can also be utilized without departing from the scope of the invention.

Cathode 16 also includes a cooling media inlet passage 14. A cooling media, either liquid or gas, is directed through a hollow cooling tube 11 in the direction of a lower inner portion 31 of electrode 9. The cooling media flows around the outside diameter of cooling tube 11 upwards and exits the plasma torch via an outlet passage 15.

Surrounding lower portion 31 of electrode 9 is a gas swirl 4, which is made of an electrically non conductive material, such as ceramic. Tangent to a lower inner surface of gas swirl 4 are a plurality of passages 32. A gas, suitable for generating a plasma, is directed through a gas supply passage 33 toward the gas swirl 4 and through the plurality of passages 32 into a cylindrical chamber 34 immediately surrounding lower portion 31 of electrode 9.

The tangential arrangement of the plurality of gas swirl passages 32 causes the gas to create a vortex around the outside lower portion of electrode 9. As the gas continues to flow in a downward direction, inside chamber 34, it escapes to the atmosphere through an axial cylindrical opening 17 in nozzle assembly 35.

Nozzle assembly 35 also comprises nozzle base 5 and nozzle insulator 19. Nozzle base 5 is generally made of copper, and nozzle insulator 19 is generally made of an electrically non-conductive material, such as ceramic.

Electrode 9 is cylindrical in shape and is generally made of copper. However, in operation, different shapes and materials may be used and still be within the scope and spirit of the invention. Insert 10 is imbedded in lower portion 31 of electrode 9. Insert 10 may be made of a variety of materials, for example, tungsten, hafnium or zirconium. Generally, the kind of material used for the manufacture of insert 10 depends on the kind of gas that will be used for generating plasma in the torch.

In operation, when a sufficiently high voltage is supplied to nozzle base 5 via anode ring 3 and conductor 13, an arc jumps from nozzle base 5 to electrode 9. The arc heats the gas passing inside chamber 34, causing the gas to be ionized. When the arc jumps from nozzle base 5 to electrode 9 in this manner, the arc is known as a non transferred arc, or a "pilot" arc. The ionized gas exits through opening 17 in nozzle assembly 35 toward a work piece 36. When the torch is in sufficiently close proximity to work piece 36, the arc jumps from the electrode's insert 10 to work piece 36. This arc is known as a "transferred" arc.

As will be realized by those skilled in the art, the present invention is capable of other and different embodiments, and its several details are capable of modifications in various obvious respects, all without departing from the scope of the invention. Accordingly, the above drawings and description should be regarded as illustrative in nature only, and not as restrictive. Modifications in materials, shapes, or other details are deemed to be within the scope of the appended claims.

What is claimed is:

1. In a plasma torch having a torch housing, a retainer removably connected to the torch housing, the retainer having an inlet and an outlet at opposite ends thereof, a means for directing a flow of gas within the retainer from the inlet to the outlet, a negatively-charged electrode mounted within the retainer adjacent to the outlet, a nozzle mounted within the retainer adjacent to the outlet, and an electrical insulator mounted within the retainer, the improvement comprising: an anode ring removably mounted to the electrical insulator and electrically connected to a power source, the anode ring further comprising two cylindrical portions of different diameters, and a flat portion therebetween.

2. The plasma arc torch as claimed in claim 1, wherein the flat portion forms a seating surface for the nozzle.

3. The plasma arc torch as claimed in claim 2, wherein the anode ring is made of an electrically conductive material.

* * * * *